(12) United States Patent
Poiret et al.

(10) Patent No.: US 6,539,699 B2
(45) Date of Patent: Apr. 1, 2003

(54) TRANSMISSION CHAIN

(75) Inventors: Christian Poiret, Coulogne (FR); Alexandre Charton, Calais (FR)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 09/942,892

(22) Filed: Aug. 30, 2001

(65) Prior Publication Data
US 2002/0065161 A1 May 30, 2002

(30) Foreign Application Priority Data
Sep. 2, 2000 (GB) .............................. 0021748

(51) Int. Cl.[7] .............................................. F16G 13/02
(52) U.S. Cl. .................... 59/5; 59/8; 59/35.1; 474/206; 474/231
(58) Field of Search .................... 59/4, 5, 8, 35.1; 474/206, 231, 212, 207

(56) References Cited

U.S. PATENT DOCUMENTS

| | | | |
|---|---|---|---|
| 2,199,292 A | 4/1940 | Pierce | 74/245 |
| 4,261,214 A | 4/1981 | Watanabe et al. | 474/156 |
| 4,615,171 A | * 10/1986 | Burk | 59/78 |
| 4,650,445 A | 3/1987 | Mott | 474/201 |
| 5,127,884 A | 7/1992 | Seymour | 474/155 |
| 5,360,378 A | 11/1994 | Suzuki et al. | 474/161 |
| 5,437,148 A | 8/1995 | Karp | 59/78 |
| 5,803,852 A | * 9/1998 | Agostinelli et al. | 474/207 |
| 5,865,021 A | * 2/1999 | Duerigen et al. | 59/4 |
| 5,966,921 A | * 10/1999 | Shimaya et al. | 59/5 |

FOREIGN PATENT DOCUMENTS

| | | |
|---|---|---|
| DE | 0564710 B1 | 5/1995 |
| DE | 19543287 A | 11/1995 |
| GB | 2270550 A | 3/1994 |
| JP | 49106449 A | 10/1974 |

OTHER PUBLICATIONS

*Scuffing—a Review*, A. Dyson, Tribology International, Apr., 1975.
*Influence du procede de mise en du $MoS_2$ sur sa resistance a l'usure adhesive*, S. Di Paolo, Dr. V. Veronesi, A. Santalini, Jun. 1975.
*Effect of Running–In Process on Scuffing*, Yuji Yamamoto, Masaaki Hashimoto, Journal of JSLE 1983.
*Gas Sulphonitriding Steels in a $CS_2$ and $NH_3$ Atmosphere*, Osamu Momose and Sosuke Uchida, Wear, 116 (1987) 19–24.

* cited by examiner

*Primary Examiner*—David Jones
(74) *Attorney, Agent, or Firm*—Akin Gump Strauss Hauer & Feld LLP

(57) ABSTRACT

The link plates, bushes or rollers of a transmission chain are treated so as to produce a surface layer of iron bisulphide. The surface improves the resistance of the chain to wear and also accelerates the running-in process.

13 Claims, 2 Drawing Sheets

TRANSMISSION CHAIN

CROSS-REFERENCE TO RELATED APPLICATIONS

This application claims priority under 35 U.S.C. §119 to Great Britain Patent Application No. 0021748.9 filed Sep. 2, 2000.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to a transmission chain and more particularly to an inverted tooth chain that is used typically as a timing chain in an internal combustion engine of a vehicle.

2. Description of the Related Art

An inverted tooth timing chain comprises a plurality of links interconnected by pins. The links comprise link plates at least some of which are connected such that they articulate on the pins. The link plates have depending teeth that mate with the teeth on the periphery of drive and driven sprockets.

The timing chain passes around a drive sprocket attached to the crankshaft of an internal combustion engine and around a driven sprocket that is attached to the camshaft so that rotary motion of the crankshaft is transmitted synchronously to the camshaft. The synchronous rotation of the sprockets is important to ensure that the movement of valves on the camshaft is in an accurate timed relationship with the movement of the pistons on the crankshaft.

In use, the individual link plates of such chains are subjected to rubbing contact with other link plates or the pins of the chain and are therefore prone to wear. Wear in chains leads to chain elongation, inefficient power transmission or unmeshing of the chain from the sprockets. This is particularly undesirable in timing chains as the camshaft may rotate several degrees out of alignment with the crankshaft and render the engine inefficient or inoperative.

It is well-known to subject the components of chains to heat treatment to improve chain endurance and to reduce the tendency to wear. The link plates and rollers may be austempered or quenched and the bushes carburized. The pins are typically carburized or coated with a diffusion alloy. These treatments are well documented in the art and are known to increase the surface hardness of the components while reducing their tendency to wear.

U.S. Pat. No. 5,437,148 describes a chain in which the link plates are coated by a dry permanent lubricant such as $MoS_2$. Similarly, JP 49 106449A discloses the coating of chains with $MoS_2$ by electro-disposition of the Molybdenum layer and then sulphiding.

It is an object of the present invention to provide for a transmission chain in which the resistance to wear is improved.

BRIEF SUMMARY OF THE INVENTION

According to a first aspect of the present invention there is provided a transmission chain having a plurality of links interconnected by pins, the links comprising link plates that have a surface layer of iron bisulphide.

The surface layer of iron bisulphide produces the best results on inverted tooth timing chains but can also be used in relation to other transmission chain with improved results.

The chain links may further comprise rollers or bushes which have a surface layer of iron bisulphide.

In a preferred embodiment the iron bisulphide layer has a thickness of between 4 and 15 $\mu$m.

According to a second aspect of the present invention there is provided an inverted tooth transmission chain having a plurality of link plates interconnected by pins, the link plates having a surface layer of iron bisulphide.

According to a third aspect of the present invention there is provided a method for reducing the initial wear rate and improving the overall wear resistance of a inverted tooth transmission chain of ferrous material comprising placing link plates of the chain in a sulphur-rich atmosphere so as to form a surface layer of iron bisulphide thereon and assembling the chain by interconnecting the link plates with pins.

BRIEF DESCRIPTION OF THE SEVERAL VIEWS OF THE DRAWINGS

A specific embodiment of the present invention will now be described, by way of example only, with reference to the accompanying drawings in which.

DETAILED DESCRIPTION OF THE INVENTION

Figure 1:
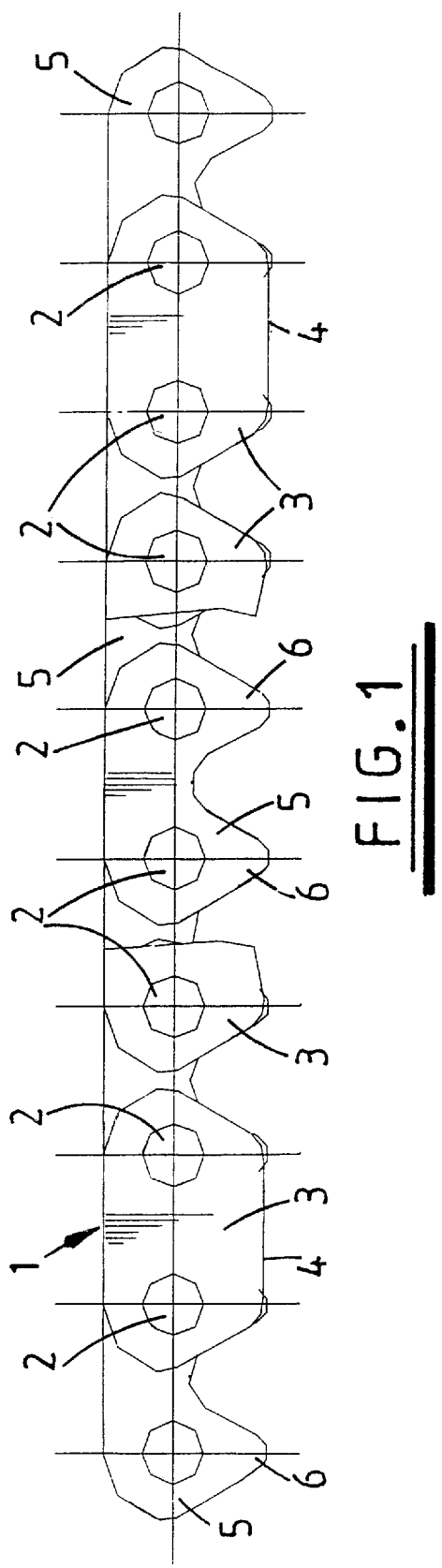
FIG. 1 is a side view of an inverted tooth timing chain in accordance with the present invention, the chain being shown partially cut-away and with center lines represented.
Figure 2:
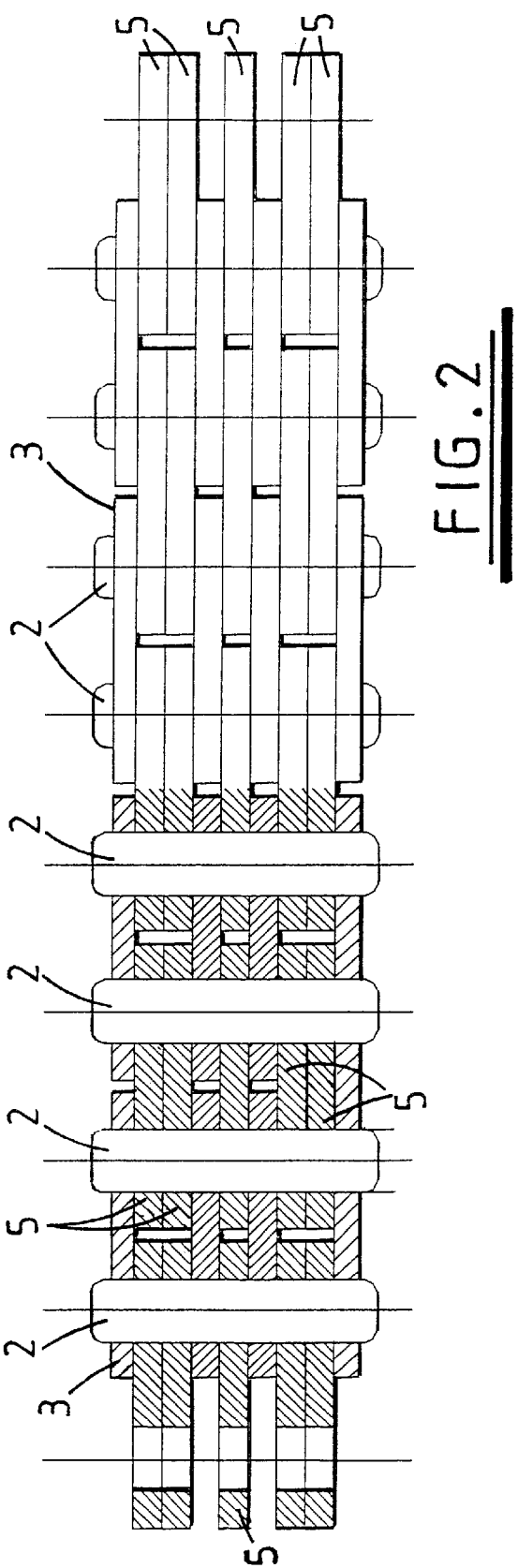
FIG. 2 is a plan view of the chain of FIG. 1, shown in partial section.

Referring now to FIG. 1 of the drawings, an inverted tooth timing chain comprises a plurality of articulating interleaved chain link plates 1 interconnected by a plurality of pins 2. Outer link plates 3 have a flat underside 4 whereas the inner link plates 5 have a toothed formation 6 for engagement with corresponding teeth on a drive sprocket (not shown).

The movement of the chain into engagement with the sprocket and then movement with the sprocket imparts rubbing contact between the inner link plates 5 and the outer surface of the pins 2 and between overlapping portions of adjacent link plates 3, 5.

Figure 3:
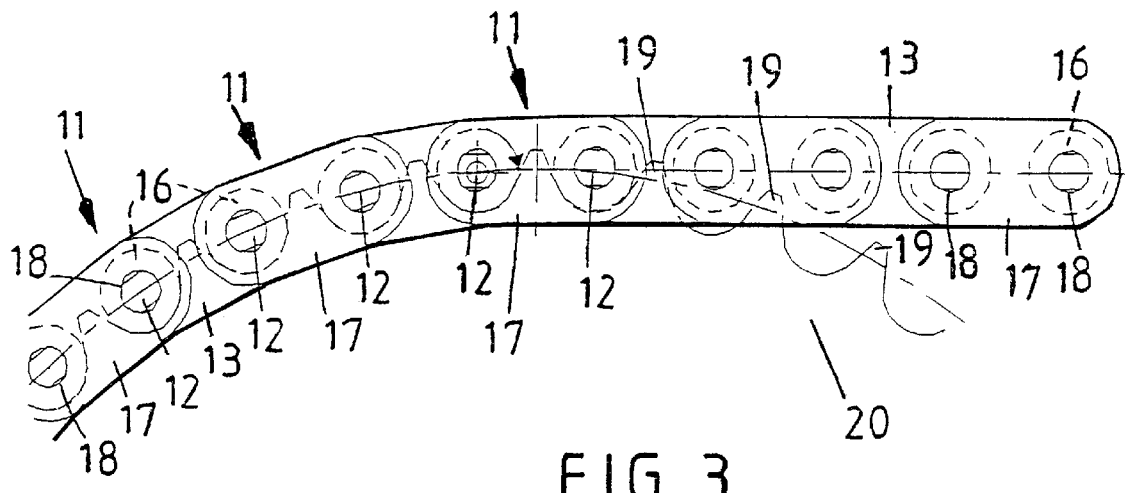
FIG. 3 is a side view of a roller chain in accordance with the present invention.

In a roller chain (illustrated in FIG. 3), links 11 are interconnected by pins 12. The links 11 comprise opposed inner link plates 13 each having a pair of spaced apertures. Opposed apertures of the inner link plates 13 receive the respective ends of a bush (not shown) in a press fit and a roller 16 is mounted rotatably thereon. Opposed outer link plates 17, also having spaced apertures 18 interconnect the inner link plates 13 on each side by the pins 12 which pass through the bushes and are engaged in a press-fit connection in the apertures 18 of the outer link plates 17.

In use, the teeth 19 of the drive and driven sprockets 20 are received in a clearance between adjacent rollers 16. The movement of the chain into engagement with the sprocket and then movement with the sprocket imparts rubbing contact between an inner surface of the bush and an outer surface of the pin, an inner surface of the rollers 6 and the outer surface of the bushes, between the inner link plates 3 and the outer surface of the pins 2, and between overlapping ends of the inner and outer link plates 3, 7.

The plates of a steel inverted tooth or roller chain are heat treated in a sulphur rich medium in, for example, a salt bath, a gas furnace, a mixture of an electrolytical-salt bath (one such process is known under the brand name SULF BT(R)) and a vacuum process (one such process is known under the brand name SULF IONIC(R)) so as to form an iron bisulphide surface layer thereon. The sulphiding process effectively draws ferrous material from the steel chain material to form the iron bisulphide layer. This layer has the ability to conform to the profile of the component with which it is in rubbing contact, accelerates the running-in process of the chain and unexpectedly improves the resistance of the chain to wear.

The sulphurizing process may be performed after a suitable heat treatment process e.g. austempering or quenching processes (for plates and rollers), carburizing, nitriding or carbon-nitriding processes (for bushes, rollers or plates). Alternatively sulphurizing may be performed simultaneously with heat treatment in a single process such as nitrosulphurisation, carbon-nitrosulphurisation.

The iron bisulphide layer is able to resist any subsequent treatments such as cleaning of the chain or its components with a solvent, this is in contrast to other wet or dry lubricants. It also eliminates the need for application of a separate lubricant whether dry (such as $MoS_2$) or wet.

EXAMPLE 1

The link plates of a steel inverted tooth transmission chain were first austempered according to a conventional technique and were then placed in a gas furnace in an atmosphere comprising a carrier gas with added $NH_3$ and $CS_2$ at a temperature of 600° C. for between 2 and 5 hours.

The removed plates were found to be coated with a porous layer of iron-bisulphide ($FeS_2$) of between 4 and 15 $\mu$m thickness.

Figure 4:
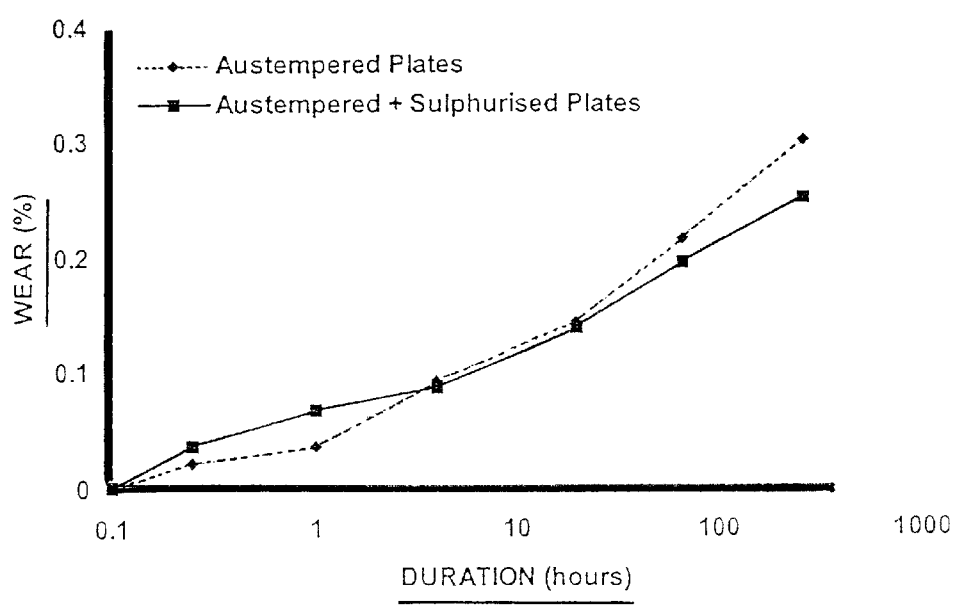
FIG. 4 is a graph showing the wear of an inverted tooth chain of the present invention over time as compared to a conventional chain.

An inverted tooth chain having link plates treated in accordance with the above example was found to have a life improved by a factor of 10 as can be seen from the graph of FIG. 4. The graph also shows, somewhat surprisingly, that the chain treated in accordance with the present invention has a wear rate higher than a conventional inverted tooth chain with austempered plates during the beginning of its life (up to approximately 7.5 hours in the example shown) and a wear rate that is lower than the conventional chain in tile long term. This means a chain that has been subjected to the sulphurizing process lends itself well to a "running-in" process prior to use as well as having enhanced wear properties. Some transmission chains are subjected to "running-in" use prior to being released on to the market as a significant amount of initial wear (and therefore chain elongation) occurs during the first few hours of use. After this initial wear has occurred chain elongation does not occur at such a rapid rate and it can be used in, for example, the timing drive of an internal combustion engine without the risk of rapid initial extension of the chain. Rapid initial wear does not generally occur in inverted tooth timing chains; wean of such chains is usually more gradual over their life. It appears that the $FeS_2$ layer affects the roughness of the surface of the chain components in such a way that a significant amount of the lifetime wear is concentrated into the first few hours so that the running-in time is reduced.

The running-in of the chain may be conducted immediately after assembly but prior to use by tightening the chain as it is circulated around two spaced sprockets. The chain is operated for a predetermined period (such as an hour) and at a predetermined speed (e.g. 6000 rpm) with a pre-selected load (such as 50 kg).

EXAMPLE 2

The link plates of an inverted tooth chain were placed in an atmosphere of 1.3 to 2.6% hydrogen sulphide (hydrosulphuric acid, $H_2S$) and ammonia $NH_3$ (the remaining balance) at a temperature of between 450 and 600° C. for a period of 15 to 60 minutes.

The chain was assembled and then tested for wear resistance. It was found that the initial wear of the chain was at a rate greater than that of conventional chains and was reduced over the life of the chain.

The sulphurizing process may be supplemented with the additional step of shaving one or more surfaces of the link plates. In particular the surface surrounding the pin apertures or the flanks of the teeth of the chain may be shaved in accordance with known techniques so as to produce a smooth surface.

It will be appreciated that although the present invention has been described above in relation to inverted tooth chains, the same treatment can be applied to other transmission chains such as a roller chain as described above. The treatment may be applied to not only the plates of a roller chain but also to the bushes and rollers.

We claim:

1. A transmission chain having a plurality of links interconnected by pins, the links comprising link plates that have a surface layer of iron bisulphide.

2. A transmission chain according to claim 1, the links further comprising rollers rotatably disposed on said pins and having a surface layer of iron bisulphide.

3. A transmission chain according to claim 1, the links further comprising bushes that are received in apertures in said link plates and which have a surface layer of iron bisulphide.

4. A transmission chain according to claim 2, the links further comprising bushes that are received in apertures in said link plates and which have a surface layer of iron bisulphide.

5. A transmission chain according to claim 1, wherein the iron bisulphide layer has a thickness of between 4 and 15 $\mu$m.

6. A transmission chain according to claim 2, wherein the iron bisulphide layer has a thickness of between 4 and 15 $\mu$m.

7. A transmission chain according to claim 3, wherein the iron bisulphide layer has a thickness of between 4 and 15 $\mu$m.

8. An inverted tooth transmission chain having a plurality of link plates interconnected by pins, the link plates having a surface layer of iron bisulphide.

9. An inverted tooth transmission chain according to claim 8, wherein the iron bisulphide layer has a thickness of between 4 and 15 $\mu$m.

10. A method for reducing the initial wear rate and improving the overall wear resistance of a inverted tooth transmission chain of ferrous material comprising placing link plates of the chain in a sulphur-rich atmosphere so as to form a surface layer of iron bisulphide thereon and assembling the chain by interconnecting the link plates with pins.

11. A method according to claim 10, wherein the chain is subjected to a running-in period during manufacture.

12. A method according to claim 10, wherein the link plates are first austempered.

13. A method according to claim 11, wherein the link plates are first austempered.

* * * * *